Nov. 24, 1931.   W. SCHWIER   1,833,863
CARBURETOR
Filed March 18, 1929   6 Sheets-Sheet 1

Nov. 24, 1931.  W. SCHWIER  1,833,863

CARBURETOR

Filed March 18, 1929    6 Sheets-Sheet 3

William Schwier, Inventor

By C. A. Snow & Co.
Attorneys.

Nov. 24, 1931.        W. SCHWIER        1,833,863
CARBURETOR
Filed March 18, 1929        6 Sheets-Sheet 4

William Schwier
Inventor

Nov. 24, 1931. W. SCHWIER 1,833,863
CARBURETOR
Filed March 18, 1929 6 Sheets-Sheet 5

William Schwier, Inventor
By C. A. Snow & Co.
Attorneys.

Patented Nov. 24, 1931

1,833,863

UNITED STATES PATENT OFFICE

WILLIAM SCHWIER, OF DETROIT, MICHIGAN

CARBURETOR

Application filed March 18, 1929. Serial No. 347,748.

One of the objects of the present invention is to provide a carburetor which will eliminate the necessity for a vacuum system, pumps, floats, and the like. Another object of the invention is to provide a carburetor which will eliminate the necessity for a choke, thereby doing away with the dilution of oil in the crank case. A further object of the invention is to supply a carburetor by which an engine may be started readily in cold weather. The invention aims to provide a carburetor which will operate unimpaired by altitude or steep grades. A further object of the invention is to provide a carburetor which will be inexpensive to manufacture, facile in operation, and not likely to get out of order.

It is within the province of the disclosure to improve generally and to enhance the utility of devices of that sort to which the invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings:—

The carburetor forming the subject matter of this application comprises a body of hollow cylindrical form. The body includes an inverted bowl 1, connected by a tapered convexed portion 61 with a reduced tubular neck 2 having an attaching flange 3, there being a mouth 62 at the place where the part 61 of the body joins the neck 2.

Across the bottom of the bowl 1 is secured a crosspiece 10 carrying a hub 11, into which is threaded a set screw 215. A tubular housing 12 is threaded into the hub 11 and is held therein by the set screw 215.

Figure 11:
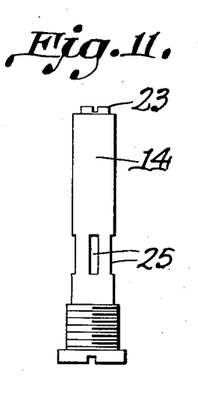
Figure 11 is an elevation showing the nozzle carrier.
Figure 12:
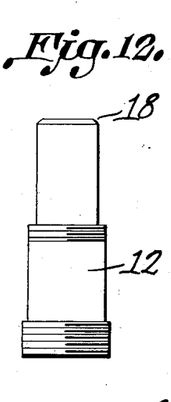
Figure 12 is an elevation of the housing for the nozzle carrier.
Figure 13:
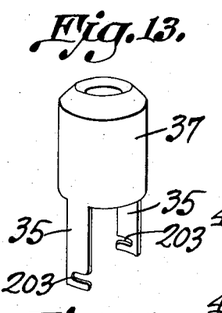
Figure 13 is a perspective view showing the adjustable cuff.
Figure 14:
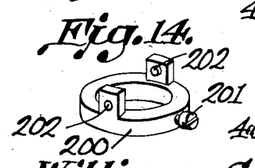
Figure 14 is a perspective view of the adjustable ring which carries the cuff of Figure 13.

The numeral 14 marks a nozzle carrier (Figures 5 and 11) threaded at its lower end into the lower end of the housing 12. In the upper end of the nozzle carrier 14 there is a recess 22 in which is threaded a nozzle 23 having a reduced bore. The nozzle carrier has a bore 20 which extends downwardly from the recess 22, part way through the nozzle carrier from end to end. The nozzle carrier 14 is supplied with cross slots 25 which communicate at their inner ends with the bore 20.

Figure 15:
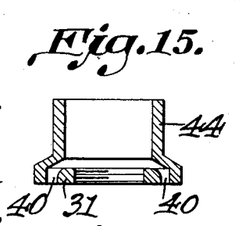
Figure 15 is a longitudinal section of the sleeve.
Figure 16:
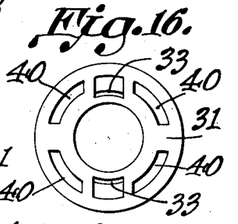
Figure 16 is a bottom plan of the sleeve shown in Figure 15.
Figure 18:
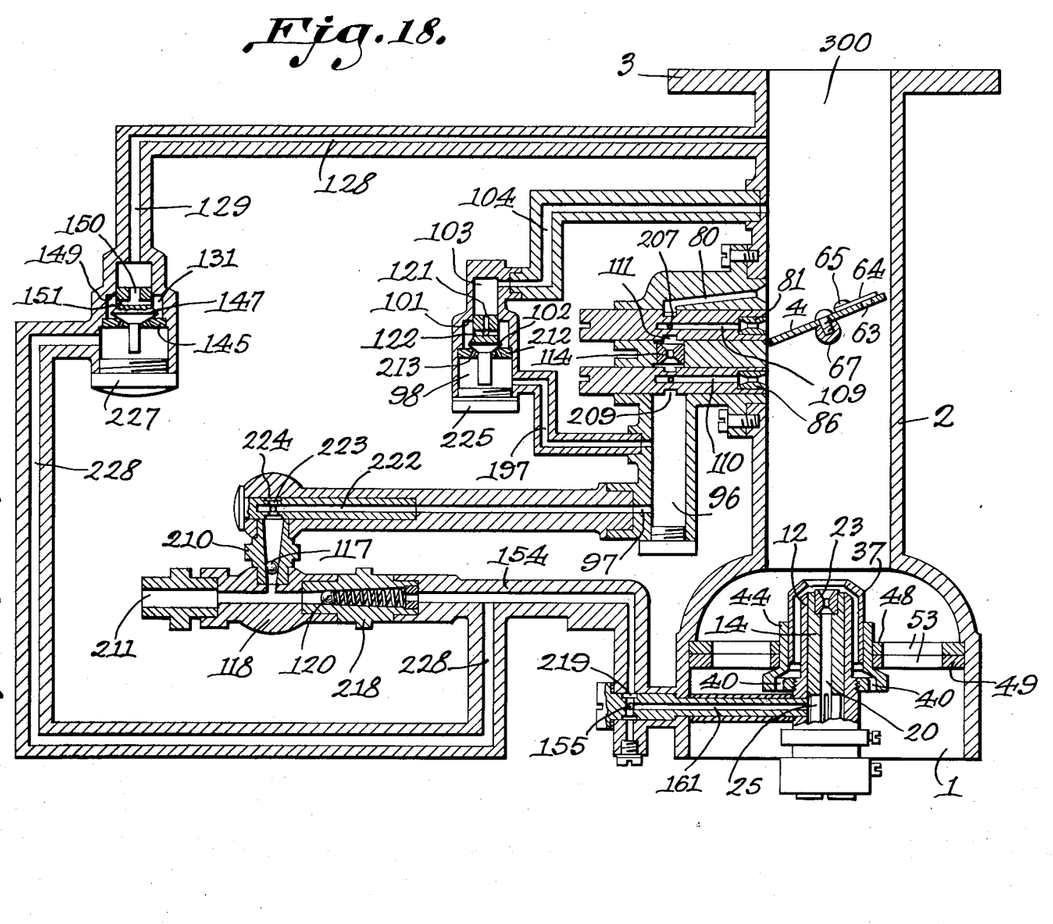
Figure 18 is a diagrammatic representation of the complete device.

The numeral 44 marks a sleeve (Figures 5, 15, and 16) the bottom of which is marked by the numeral 31. There are openings 40 in the bottom 31 of the sleeve, for the passage of air, and the sleeve has guide openings 33. The tubular housing 12 extends into the sleeve 44, and the bottom of the sleeve is threaded on the housing 12.

Figures 5, 6, 17:
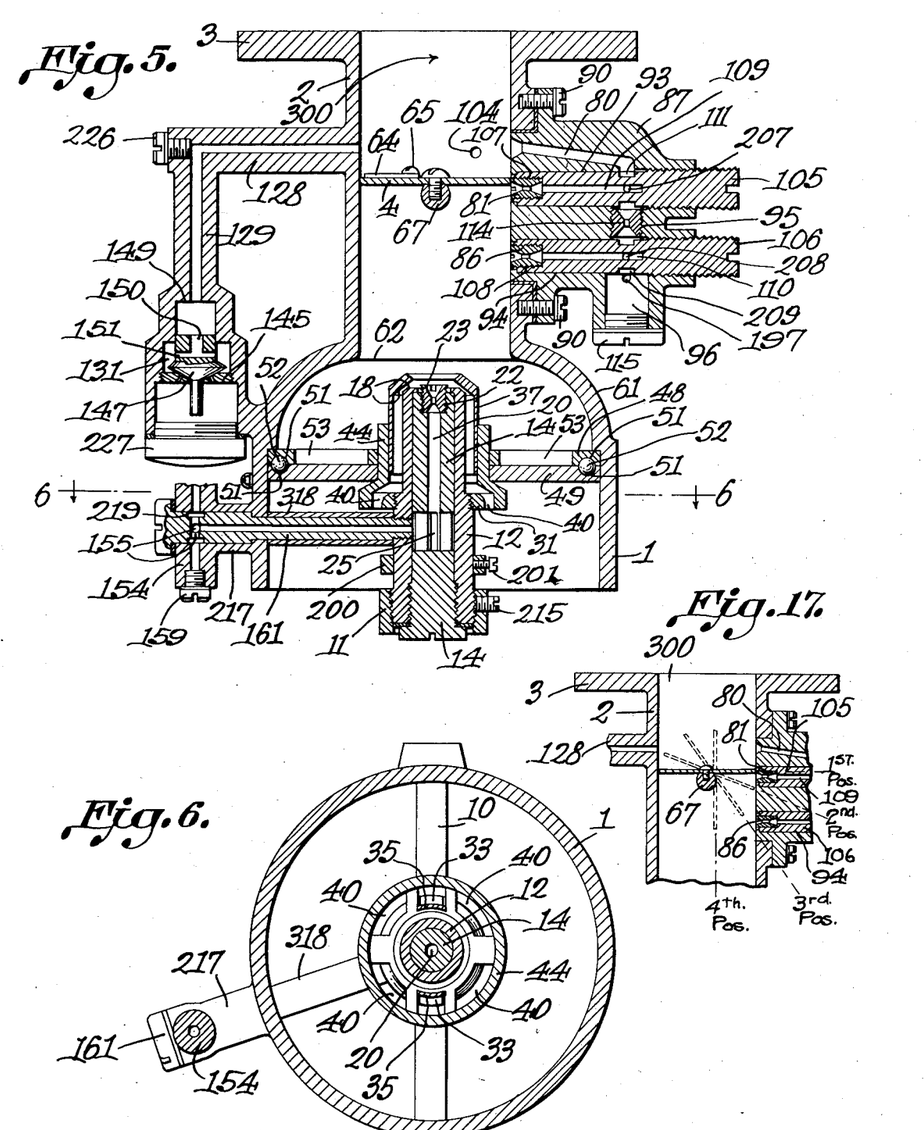
Figure 5 is a section on the line 5—5 of Figure 2.
Figure 6 is a section on the line 6—6 of Figure 5.
Figure 17 is a diagram showing different positions of the butterfly valve.

The numeral 37 (Figures 5 and 15) marks a cuff that is vertically adjustable in the sleeve 44, the cuff overhanging the upper end of the nozzle housing 12, as Figure 5 will show. The upper end surface of the housing 12 and the under surface of the end of the cuff 37 are designated by the numeral 18 and when brought together afford a hermetic closure. The cuff 37 has depending arms 35 which are received slidably in the guide openings 33 that are formed in the bottom 31 of the sleeve 44. There are seats 203 in the arms 35, the seats being adapted to receive studs 202 on a ring 200 which is vertically adjustable on the tubular housing 12. A set screw 201 is threaded into the ring 200 and engages the housing 12 to hold the ring and the cuff 37 in any position to which they may have been adjusted vertically.

Figure 1:
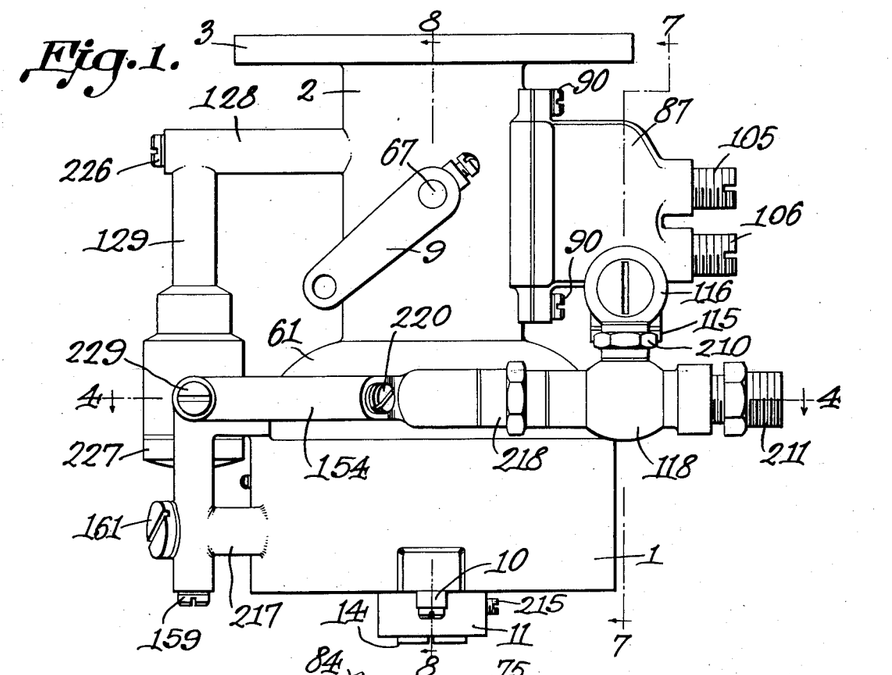
Figure 1 shows, in side elevation, a carburetor constructed in accordance with the invention.
Figure 2:
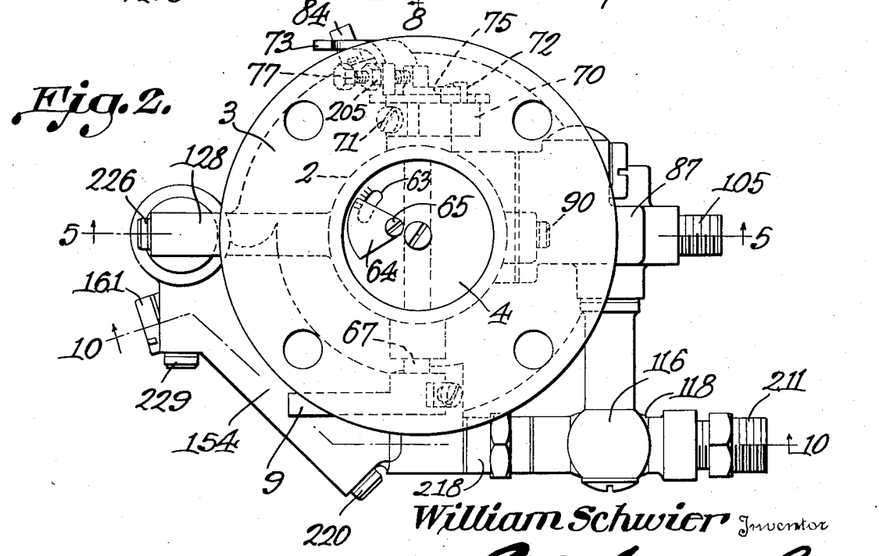
Figure 2 is a top plan.
Figure 3:
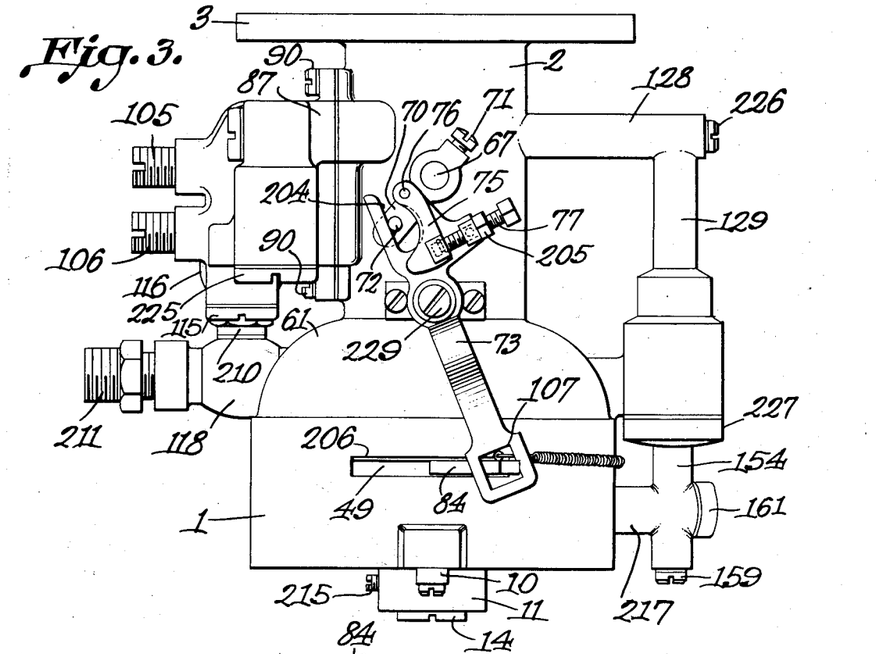
Figure 3 is an elevation showing the opposite side of the carburetor from that depicted in Figure 1.
Figure 4:
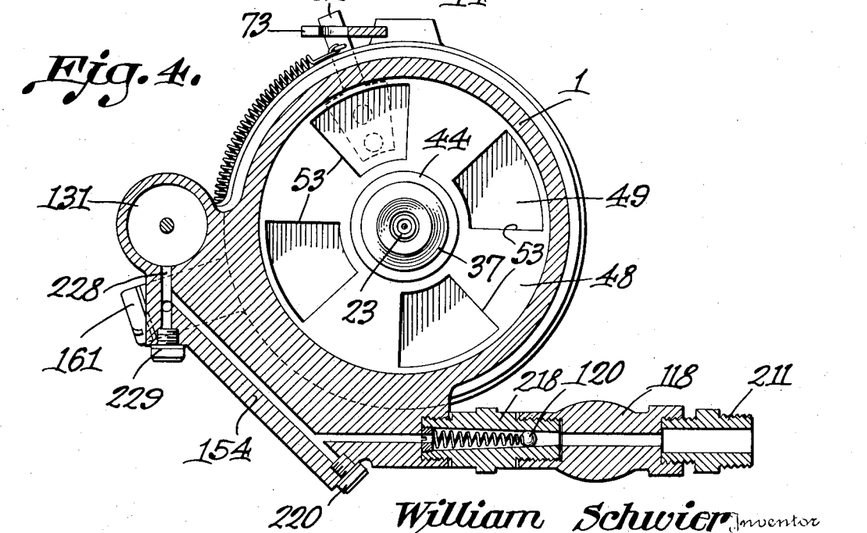
Figure 4 is a section on the line 4—4 of Figure 1.
Figure 10:
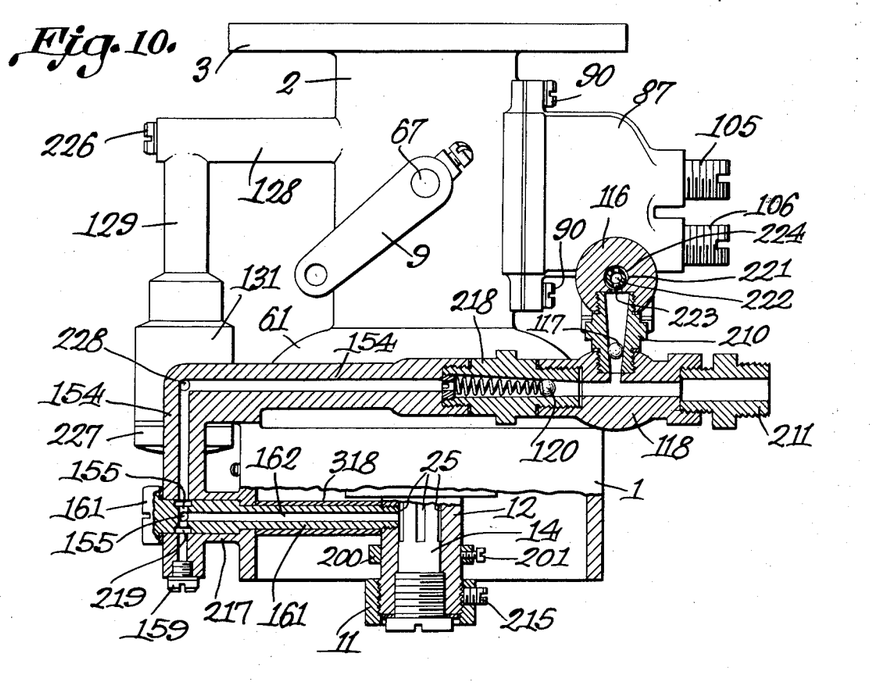
Figure 10 is a section on the line 10—10 of Figure 2.

The numeral 211 in Figure 3, for instance, designates a source of liquid fuel supply joined to a T 118, the outline of which is best seen in Figure 2. Into the inner end of the T 118 (Figure 4) is threaded a casing 218 containing a check valve 120 which closes toward the source 211 of fuel supply. The valve casing 218 is threaded into an elbow 154 (Figure 10) including a horizontal branch and a vertical branch. The horizontal branch of the elbow 154 (Figure 4) is integral with the bowl 1, but the vertically depending part of the elbow 154 (Figure 1) is spaced from the bowl 1. The vertical depending part of the elbow 154 is connected by a tubular piece 217 with the bowl 1, as shown in Figure 10. In the lower end of the vertical depending part of the elbow 154 there is a screw plug 159.

A tubular member 161 (Figure 10) extends across the vertical depending arm of the elbow 154, and through the connecting piece 217. The inner end of the tubular member 161 is located within the bowl 1 and is threaded into the tubular housing 12. A spacer 318 may be disposed about the tubular member 161, between the housing 12 and the wall of the bowl 1. The tubular member 161 has a longitudinal bore 162 which communicates at its inner end with one of the cross slots 25 of the nozzle carrier 14, as Figure 5 will show. The tubular member 161 has cross passages 155 disposed at the outer end of the bore 162. At their outer extremities the passages 155 communicate with an external circumferential recess 219 in the tubular member 161, and this recess 219 is in communication with the vertical depending arm of the elbow 154, as Figure 10 will show. To provide for easy cleaning, the bore of the horizontal part of the elbow 154 (Figure 4) is branched off and stopped by a removable screw plug 220.

Figure 7:
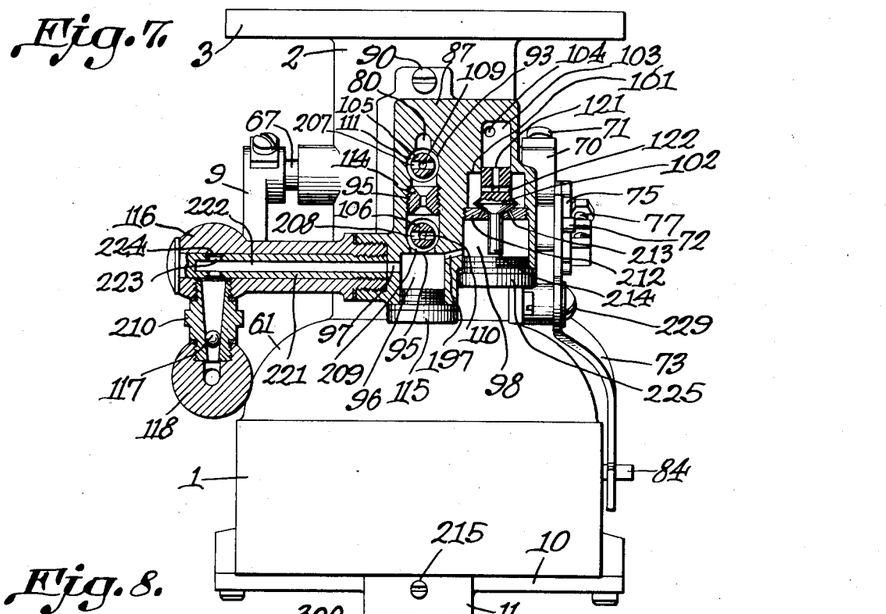
Figure 7 is a section on the line 7—7 of Figure 1.

Figures 5 and 1 show that an extension, in the form of a block 87, is screwed at 90 to one side of the neck 2, the block appearing in vertical cross section in Figure 7. In the bottom part of the extension 87 there is a well 96, which can be seen in Figures 5 and 7, and this well is closed at its bottom end by a screw plug 115. The pipe 116 (Figure 7) is threaded into one side of the extension or block 7. A tubular member 221, like the tubular member 161, is threaded at its inner end into the pipe 116. The tubular member 221 has a longitudinal bore 222 which communicates through an opening 97 (Figure 7) with the well 96. At its outer end, the tubular member 221 has cross passages 223 communicating with an external circumferential recess 224 in the tubular member 221. The outer end of the pipe 116 is joined by a casing 210 (Figures 7, 1, and 10) with the T 118 which is interposed in the fuel supply line. In the casing 210 there is a check valve 117 which closes toward the T 118, that is, toward the source of fuel supply.

Referring to Figure 5 in conjunction with Figure 7, the drawings show that in the block 87 there is a lower bore 94 which, at its inner end, communicates with the neck 2 of the carburetor body. Into the lower bore 94 is threaded a nozzle carrier 106 having an external circumferential groove 209. The groove 209 is connected by cross bores 208 with a longitudinal passage 110 in the nozzle carrier 106. At the forward end of the nozzle carrier 106 there is an enlarged recess 108 in which is threaded a nozzle 86 that is in communication with the longitudinal passage 110. The nozzle 86 discharges into the neck 2 of the carburetor body. An intermediate bore 93 is formed in the block or extension 87. The bore 93 is parallel to the bore 94 and opens at its inner end into the neck 2. The bore 93 is connected to the bore 94 by an opening 95, disposed at right angles to the bore. The circumferential groove 209 of the nozzle carrier 106 is in communication with the well 96 and with the lower end of the connecting opening 95.

A reducer 114 is threaded into the connecting opening 95, and is located below a nozzle carrier 105, threaded into the intermediate bore 93. The nozzle carrier 105 has an external circumferential groove 111 connected by cross bores 207 with a longitudinal passage 109 in the carrier 105, the passage 109 communicating at its forward end with an enlarged recess 107 in the nozzle carrier. Into the recess 107 is threaded a nozzle 81, constructed like the nozzle 86. Near to its top, the block 87 is supplied with an idling adjustable duct 80. At one end, the duct 80 is flared and communicates with the neck 2. At its opposite end, the duct 80 communicates with the passage 93 in alignment with the circumferential groove 111 of the nozzle carrier 105, that groove communicating, also, with the connecting passage 95.

Figure 7 shows that there is a well 98 in the block 87, to one side of the well 96. A hole 197 in the block 87 establishes communication between the well 96 and the well 98. A screw plug 225 closes the bottom of the well 98. The upper portion of the well 98 is reduced in diameter, as shown at 103, to form a shoulder 101, constituting a stop for a valve 102. The valve 102 is adapted to close down on a seat 212 in the well 98 and to cover openings 213 which extend through the seat 212. The valve 102 has a stem 214 that slides in the seat 212, the upper portion of the valve sliding in the part 103 of the well 98. An opening 104 (Figures 7 and 5) establishes communication between the neck 2 of the carburetor body and the upper part 103 of the well 98. In the upper end of the valve 102 there is a longitudinal bore 121 communicating at its lower end with transverse bores 122 in the said valve.

Referring to Figures 5 and 10 there is shown a pipe made of a horizontal branch 128 and a vertical depending branch 129. The branch 128 communicates at its inner end with the neck 2 of the carburetor, and in the outer end of the branch 128 there is threaded a screw closure plug 226. The lower end of the branch 129 communicates with a chamber 131 formed in a part that is joined to the part 61 of the carburetor body. The lower end of the chamber 131 is closed by a removable screw plug 227. In the chamber 131 is located a seat 145 constructed like the seat 212 of Figure 7. A downwardly closing valve 147 cooperates with the seat 145 and is made like the valve 102 hereinbefore described in detail. The longitudinal bore of the valve 147 is shown at 150, and a transverse passage appears at 151. A bore 228 (Figures 4 and 10) connects the intermediate part of the chamber 131 with the elbow 154 in the fuel supply line. The bore 228 is closed at its outer end by a removable plug 229.

Figures 8, 9:
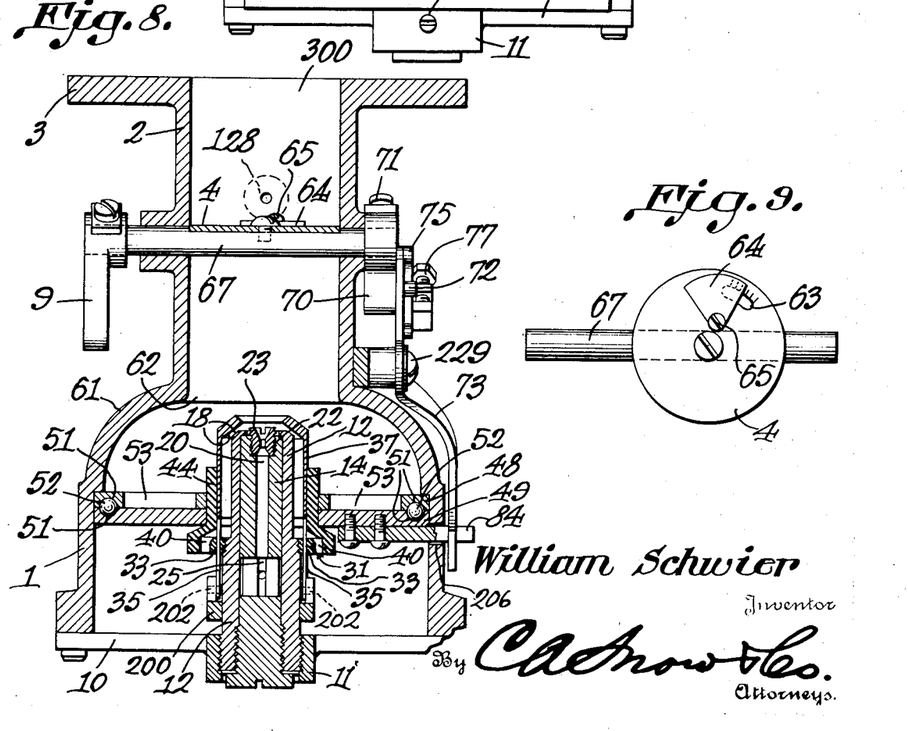
Figure 8 is a section on the line 8—8 of Figure 1.
Figure 9 is a plan of the butterfly valve and the ring which carries it.

Refer to Figures 8 and 5. A partition 48 surrounds the sleeve 44 and extends outwardly to the body 1. The partition 48 is fixed. Below the partition 48 is located an air valve 49 mounted to rotate on the sleeve 44. The air valve 49 and the partition 48 have openings 53 (Figure 4) adapted to be brought into and out of registration when the valve 49 is rotated. The partition 48, and the valve 49 have races 51 in which are located balls 52 which facilitate the rotation of the air valve 49. The air valve 49 has an arm 84 (Figures 3 and 4) which extends outwardly through a slot 206 in the bowl 1 of the carburetor.

A shaft 67 is mounted to rock in the neck 2 and carries a butterfly valve 4 located within the neck. The butterfly valve 4 has a calibrated opening 63 (Figures 2 and 9) governed by a valve 64 held on the butterfly valve 4 by a combined pivot and clamp screw 65. On one end of the shaft 67 is held an arm 9 operated by any suitable mechanism (not shown) under the governance of an operator. On the opposite end of the shaft 67 there is an arm 70, shown in Figure 3, and held in adjusted positions on the shaft by a set screw 71.

The arm 70 carries a pin or projection 72 received in a notch 204 formed in the upper end of a lever 73 fulcrumed intermediate its ends at 229 on the carburetor body. The pin 72 on the lever 73 is adapted to cooperate with an adjusting member 75 pivoted at 76 to the lever 73. An adjusting screw 77 is held for rotation in the lower end of the adjusting member 75 and is threaded into a seat located on the lever 73, a lock nut 205 being used to hold the screw 77 in any position to which it may have been adjusted. The lever 73 is provided at its lower end with a hole 107 into which projects the arm 84 of the air valve 49, and it may be said, therefore, that the lever is operatively connected to the air valve.

Noting Figure 17 of the drawings, it will be observed that the butterfly valve 4 is shown in four positions, designated as the first position, the second position, the third position, and the fourth position. The first position is a completely closed or idling position, the fourth position is a completely opened position, and the second and third positions are intermediate to fully opened position and fully closed position.

In order to avoid repetition or lengthy description, several paths traversed by the air and by the fuel will be traced out, and designated by an appropriate title or letter and hereinafter referred to by letter or number.

*Air course A.*—Air enters the bottom of the inverted bowl 1, moves upwardy through the registering openings 53 of the partition 48 and the air valve 49, upwardly in the neck 2, through the calibrated opening 63 in the butterfly valve 4 when the butterfly valve is in the closed or first position of Figure 17, and out of the top of the neck 2.

*Air course B.*—Air enters the bottom of the inverted bowl 1, moves upwardly through the openings 53 of the partition 48 and the air valve 49, and through the neck 2, the butterfly valve being in the second, third, and fourth positions of Figure 17.

*Air course C.*—Air enters the bottom of the inverted bowl 1, and moves upwardly through the openings 40 in the bottom 31 of the sleeve 44, through the space between the cuff 37 and the housing 12, and out of the top of the housing 12, over the top of the nozzle 23.

*Fuel course D.*—Fuel from the source 211 traverses the T 118, the valve casing 218, the elbow 154, the external groove 219, the cross passages 155, the bore 161, the cross slots 25, the bore 20, and the nozzle 23.

*Suction course E.*—Fuel from the source 211 traverses the T 118, the valve casing 218, the elbow 154, the bore 228, and enters above the plug 227 of Figures 5 and 10, and below the valve 147 of Figure 5.

*Fuel course F.*—Fuel from the source 211 traverses the T 118, the valve casing 210, the external groove 224, the cross passages 223, the bore 222, the hole 97, the well 96, the external groove 209, the cross passages 208, the bore 110, and the nozzle 86, and enters the neck 2.

*Fuel course G.*—Fuel from the source 211 traverses the T 118, the valve casing 210, the external groove 224, the cross passages 223, the bore 222, the hole 97, the well 96, the external circumferential groove 209, the reducer 114, the external groove 111, the cross bores 207, the passage 109, and the nozzle 81, and enters the neck 2.

*Fuel course H.*—Fuel from the source 211 traverses the T 118, the valve casing 210, the external groove 224, the cross passages 223, the bore 222, the hole 97, the well 96, the external circumferential groove 209, the reducer 114, the external groove 111, and the duct 80, and enters the neck 2.

*Suction course I.*—Fuel from the source 211 traverses the T 118, the valve casing 210, the external groove 224, the cross passages 223, the bore 222, the hole 97, the well 96, the hole 197, and enters above the plug 225 of Figure 7, below the valve 102.

When the butterfly valve is in the first or idling position, the openings 53 of the air valve 49 and the partition 48 are not in registration. The openings 53 of the air valve 49 and of the partition 48 do not come into registration for the passage of air until a stage in the operation of the carburetor has been reached where the projection 72 of the arm 70 of Figure 3 comes into contact with the wall of the notch 204 of the lever 73. The position of the valve 64 (Figure 9) with regard to the opening 63 in the butterfly valve 4 is of a factory adjustment and ordinarily the valve 64 need not be shifted after the car leaves the factory. The space 300 above the closed butterfly valve 4 is a low pressure space, and the opening 63 in the butterfly valve 4 is not of sufficient size to affect the low pressure in the space 300 to any appreciable degree when the butterfly valve 4 is in the first or closed position. When the parts are arranged as above described, the fuel moves through the fuel course H in sufficient quantity to permit the engine to idle, fuel being supplied through the duct 80.

When the butterfly valve 4 moves toward the second position of Figure 17, the fuel follows the fuel course G and enters the neck 2 by the nozzle 81. The air valve 49 does not open at this stage because the pin 72 on the arm 70 has some movement in the slot 204 of the lever 73, the effective size of the slot being regulated by the position of the adjuster 75. The projection 72 of the lever 73 now engages the adjuster 75, the lever 73 is tilted on its fulcrum 229, and the air valve 49 begins to open, the air moving through air course B. The carburetor now assumes a fully open position, fuel moves through the fuel course D and the air flows through the air courses A and C.

The valve 102 moves to and from the shoulder 101, responsive to suction through the opening 104, and thus the supply of fuel to the nozzles 86 and 81 is regulated. As soon as the engine starts, a partial vacuum is established through the opening 104 in the chamber 103, the valve 102 rising from its seat 212 thereby exposing the openings 213, and a vacuum pull, consequently, is applied to the chamber 98, the opening 197, the feed well 96, the opening 97, the pipe 222, the casing 210, the member 118, and the source 211 of fuel supply.

When the engine is idling, the check valve 117 opens so as to permit fuel to pass from the source 211 of supply to the various outlets 80, 81, and 86, and closes when the butterfly valve is in the fourth position of Figure 17. The valve 117, however, opens as soon as the butterfly valve is moved toward the first or idling position of Figure 17.

When the butterfly valve moves toward the fourth position of Figure 17, the low pressure area 300 moves downwardly to the upper surface of the partition 48, and fuel is drawn through the main jet 23. The pull of the main jet or nozzle 23 is increased when the butterfly valve 4 is opened, and tends to seat the chcek valve 117 until such time as the butterfly valve again is moved to closed position. Then the pull of the check valve is increased, because the low pressure area is transferred to the upper end of the neck 2, above the butterfly valve 4, the space below the butterfly valve being cut off from the low pressure space above the butterfly valve. Then the pull of the check valve is increased, thereby rendering the operation of the main nozzle subject to the opening of the butterfly valve 4 to the position shown at 4 in Figure 1. This operation, being carried out in synchronized sequence, is an improved feature and prevents the flow through the casing 210 from being stopped by the flow through the casing 218 (Figure 10) and vice versa.

The valve 102 and the valve 147 prevent back pressure upon the fuel. It has been pointed out hereinbefore, how the valve 102 operates, and as to the valve 147, it may be stated that as soon as a partial vacuum is established in the chamber 131, through the pipes 128 and 129, the valve 147 lifts from its seat 145, thereby opening the passages in the seat 145, the vacuum pull being transferred to the check valve 120, causing the check valve to open for the passage of fuel.

In further explanation of the function and operation of the valves 102 and 147, it may be stated that they are suction-operated, and control the application of vacuum pull upon fuel from the source 211 of fuel supply. The channels 128 and 104 communicate with the space 300 above the butterfly valve 4, the butterfly valve being in the first position of Figure 17, the space 300 being a low pressure space or partial vacuum space. Suction is created, through the channels 128 and 104, and the valves 102 and 147 close upwardly. The valves 102 and 147 oscillate or flutter to and from upwardly closed position, and the space above the plug 227 of Figure 5 and above the plug 225 of Figure 7 are filled to a greater or less extent with fuel. The flow through the idling duct 80 of Figure 5 lowers the level of the fuel in the space above the plug 227 and above the plug 225, and this circumstance, together with the weight of the valves 102 and 147, produces the oscillation or flutter of the valves hereinbefore mentioned. The movement of the valves 102 and 147 is automatic, rapid, and responsive to the movement of the ordinary throttle lever, not shown, which is under the control of an operator.

When the engine starts, the valve 147 is seated at 145, but instantly rises from its said seat thereby transferring the suction to the source of supply, and as the fuel rushes in, the vacuum increases in the chamber 131, and the valve 147 rises until it sits at 149 in the chamber 131. Thereupon the back pressure through the main nozzle 23 causes the check valve 120 to sit firmly, thereby holding the fuel to the level of the main nozzle 23 in such a position as to be instantly available for use when the butterfly valve is advanced to the fourth position of Figure 17.

When the level of the fuel is established in the nozzle carrier 14, at the first revolution of the engine, by reason of the diminution of pressure in the area 300 above the butterfly valve 4, the valve 147 will maintain its seat 149, until the time when the butterfly valve is moved to the position shown at 4 in Figure 17. Thereupon, the lessened vacuum in the chamber 131 will cause the valve 147 to move downwardly from the seat at 149 until the passage 150—151 in the valve is in communication with the chamber. Then the valve 147 again assumes its seat at 149 after having established a comparatively high state of vacuum in the chamber 131 and parts connected therewith. The operation above referred to takes place rapidly and serves to hold the fuel at a constant level in the nozzle 23.

I claim:—

1. A carburetor comprising a body, a butterfly valve in the body, an air valve in the body, a main nozzle discharging into the body between the air valve and the butterfly valve on one side of the butterfly valve, a duct discharging into the body on the opposite side of the butterfly valve, a second nozzle discharging into the body on the first specified side of the butterfly valve, an intermediate nozzle discharging into the body between the duct and the second nozzle and communicating with the duct and with the second nozzle, a first well in communication with the second nozzle, a second well in communication with the first well, a branch extended from the second well and communicating with the body on said opposite side of the butterfly valve, a source of fuel supply communicating with the main nozzle and having a branch communicating with the body on said opposite side of the butterfly valve, a check valve in said source between its intake end and the first well, a check valve in said source between its intake end and the main nozzle, suction valves in the branches, and means for connecting the butterfly valve operatively with the air valve.

2. A carburetor comprising a body, a butterfly valve in the body, an air valve in the body, a main nozzle discharging into the body between the air valve and the butterfly valve on one side of the butterfly valve, a duct discharging into the body on the opposite side of the butterfly valve, a second nozzle discharging into the body on the first specified side of the butterfly valve, an intermediate nozzle discharging into the body between the duct and the second nozzle and communicating with the duct and with the second nozzle, a source of fuel supply communicating with the main nozzle, with the duct, with the intermediate nozzle, and with the second nozzle and having a branch communicating with the body on said opposite side of the butterfly valve, a check valve in said source between its intake end and the second nozzle, a check valve in said source between its intake end and the main nozzle, a suction valve in the branch, and means for connecting the butterfly valve operatively with the air valve.

3. A carburetor comprising a body, a butterfly valve in the body, an air valve in the body, a main nozzle discharging into the body between the air valve and the butterfly valve on one side of the butterfly valve, a duct discharging into the body on the opposite side of the butterfly valve, a second nozzle discharging into the body on the first specified side of the butterfly valve, an intermediate nozzle discharging into the body between the duct and the second nozzle and communicating with the duct and with the second nozzle, a source of fuel supply communicating with the main nozzle, with the duct, with the intermediate nozzle, and with the second nozzle, and having a branch communicating with the body on said opposite side of the butterfly valve, a check valve in said source between its intake end and the second nozzle, a check valve in said source between its intake end and the main nozzle, and a suction valve in the branch.

4. A carburetor comprising a body, a butterfly valve in the body, an air valve in the body, a main nozzle discharging into the body between the air valve and the butterfly valve on one side of the butterfly valve, a duct discharging into the body on the opposite side of the butterfly valve, a second nozzle discharging into the body on the first specified side of the butterfly valve, and communicating with the duct, a source of fuel supply communicating with the duct, and with both nozzles, and having a branch communicating with the body on said opposite side of the butterfly valve, a check valve in said source between its intake end and the second nozzle, a check valve in the said source between its intake end and the main nozzle, a suction valve in the branch, and means for connecting the butterfly valve operatively with the air valve.

5. A carburetor comprising a body, a butterfly valve in the body, a partition in the body, the partition having an opening, an air valve controlling the opening, a main nozzle discharging into the body between the air valve and the butterfly valve and extended through the partition, a cuff slidable through the partition toward and away from the outlet end of the main nozzle, the outlet end of the main nozzle and one end of the cuff being disposed on one side of the partition, and means located on the opposite side of the partition for connecting the cuff to the nozzle for adjustment longitudinally of the nozzle toward and away from the outlet end of the nozzle.

6. A carburetor comprising a body, a shaft journaled in the body, a butterfly valve in the body and carried by the shaft, an arm on the shaft and provided with a projection, an air valve movable in the body, a fuel nozzle discharging into the body, between the valves, a lever fulcrumed intermediate its ends on the body, the lever having an opening, and a projection on the arm having limited movement in the opening, means for pivotally connecting the lever with the air valve, an adjuster forming one wall of the opening in the lever, and means for mounting the adjuster on the lever for movement toward and away from the opposite wall of the opening, thereby to regulate the play of the projection of the arm in the opening of the lever.

In testimony whereof that I claim the foregoing as my own, I have hereto affixed my signature.

WILLIAM SCHWIER.